(12) United States Patent
Koo

(10) Patent No.: US 7,574,614 B2
(45) Date of Patent: *Aug. 11, 2009

(54) METHOD AND APPARATUS FOR CHANGING A DIGITAL PROCESSING SYSTEM POWER CONSUMPTION STATE BY SENSING PERIPHERAL POWER CONSUMPTION

(75) Inventor: Kwanghoi Koo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 11/286,848

(22) Filed: Nov. 22, 2005

(65) Prior Publication Data

US 2006/0136759 A1  Jun. 22, 2006

Related U.S. Application Data

(63) Continuation of application No. 09/954,378, filed on Sep. 12, 2001, now Pat. No. 6,981,161.

(51) Int. Cl.
  G06F 1/26 (2006.01)
  G06F 1/32 (2006.01)
(52) U.S. Cl. ..................... 713/310; 713/320
(58) Field of Classification Search .......... 713/300, 713/310
  See application file for complete search history.

(56) References Cited

U.S. PATENT DOCUMENTS

| | | | | |
|---|---|---|---|---|
| 4,722,078 A | * | 1/1988 | Nakanishi et al. | 369/30.92 |
| 5,666,541 A | * | 9/1997 | Sellers | 713/324 |
| 5,799,199 A | * | 8/1998 | Ito et al. | 713/324 |
| 5,953,513 A | * | 9/1999 | Saiki et al. | 710/62 |
| 5,963,524 A | * | 10/1999 | Tokiwa et al. | 369/53.23 |
| 6,215,609 B1 | * | 4/2001 | Yamashita et al. | 360/73.03 |
| 6,262,858 B1 | * | 7/2001 | Sugiyama et al. | 360/66 |
| 6,272,645 B1 | * | 8/2001 | Wang | 713/323 |
| 6,367,022 B1 | * | 4/2002 | Gillespie et al. | 713/300 |
| 6,546,494 B1 | * | 4/2003 | Jackson et al. | 713/300 |
| 6,611,166 B2 | * | 8/2003 | Chan et al. | 327/536 |
| 6,622,252 B1 | * | 9/2003 | Klaassen et al. | 713/320 |
| 6,631,469 B1 | * | 10/2003 | Silvester | 713/2 |
| 6,760,852 B1 | | 7/2004 | Gulick | |
| 6,981,161 B2 | * | 12/2005 | Koo | 713/310 |
| 2002/0023237 A1 | * | 2/2002 | Yamada et al. | 713/323 |

FOREIGN PATENT DOCUMENTS

JP  2000-003233  * 1/2000

\* cited by examiner

*Primary Examiner*—Chun Cao
(74) *Attorney, Agent, or Firm*—Blakely, Sokokloff, Taylor & Zafman LLP

(57) ABSTRACT

A method and apparatus senses peripheral power consumption for system power control. In a digital processing system, an increase in current drawn by a peripheral device coupled to the digital processing system while the digital processing system is in a reduced power consumption state is sensed, wherein the increase in current drawn provides a current draw detect signal.

37 Claims, 8 Drawing Sheets

METHOD AND APPARATUS FOR CHANGING A DIGITAL PROCESSING SYSTEM POWER CONSUMPTION STATE BY SENSING PERIPHERAL POWER CONSUMPTION

RELATED APPLICATIONS

This application is a continuation application of U.S. patent application Ser. No. 09/954,378, filed Sep. 12, 2001 now U.S. Pat. No. 6,981,161.

FIELD OF THE INVENTION

The field of the invention relates to sensing of current drawn by a peripheral device in a digital processing system.

BACKGROUND OF THE INVENTION

Most modern computers have a reduced energy consumption mode for energy conservation. One such mode is known as a "sleep" mode. In a sleep mode, all unnecessary components are shut down or put into a minimum power consumption mode to save energy, which usually requires a further sequence a device activation process before they can be used in a normal operation mode. "Standby" mode is another type of reduced energy consumption mode which uses even less energy than sleep mode and therefore requires more time to "wake up." One example of the operation of a sleep mode can be seen in battery-operated devices, such as notebook computers. When a notebook computer goes into sleep mode, it shuts down the display screen and disk drive. When the computer is "awakened", it resumes normal power consumption and operating status.

There are several state-of-the-art approaches to awaken a computer from sleep mode. The most common way is to awaken the computer upon the user's moving or clicking a mouse or striking a key on the keyboard. Ethernet "magic packets," i.e., special bitstreams that wake up the system remotely through an Ethernet connection, can also be used. Similarly, a modem ring detect can wake the computer when a call is received by its modem. A similar approach uses firewire.

When a machine readable removable media such as a CD-ROM is inserted into a peripheral device while its computer system is in sleep mode, however, the computer system does nothing. Thus, there is a need for automatically waking a computer from sleep mode upon the insertion of a removable media into a peripheral device connected to the computer.

SUMMARY OF THE INVENTION

A method and apparatus senses peripheral power consumption for system power control. In a digital processing system, an increase in current drawn by a peripheral device coupled to the digital processing system while the digital processing system is in a reduced power consumption state is sensed, wherein the increase in current drawn provides a current draw detect signal.

When a disk is inserted into a drive during a sleep mode, the "disk insert event" draws significantly more current than during sleep mode. This change in current drawn by the drive can be sensed and a signal can be provided to the computer system indicating the change. The change signal can be used to perform a function such as a system wakeup. In one embodiment, the computer automatically runs the content of the disk or starts the execution of a preprogrammed operation immediately after system wakeup. For example, if an audio music CD were inserted into the computer, the insert event would trigger a wakeup signal and the system would then begin to play the music content on the CD automatically after the computer woke up.

In one embodiment, the provision of the current draw detect signal requires no special disk drive. A current sensing mechanism can be added to a state-of-the-art type of computer system to sense the increased current drawn by the drive at a disk insert event.

DETAILED DESCRIPTION

A method and apparatus senses peripheral power consumption for system power control. In a digital processing system, an increase in current drawn by a peripheral device coupled to the digital processing system while the digital processing system is in a reduced power consumption state is sensed, wherein the increase in current drawn provides a current draw detect signal.

The term digital processing system will be used interchangeably with the terms computer and computer system. A peripheral device is a device attached to a computer. The peripheral device may be an external device, relative to the housing of the computer system, or it may be an internal device with the same housing as the computer system. In one embodiment of the invention, a peripheral device which has its current consumption monitored is a DVD ROM drive or other optical media drive which is contained within the housing of a laptop computer, such as a Macintosh™ Powerbook™ from Apple™ Computer, Inc. This optical drive may be a slot-loading drive. The terms disk drive, optical disk drive, CD ROM drive, drive, and peripheral device will be used interchangeably. It will be appreciated that other types of peripheral devices (e.g., CD-RW-ROM drives, Zip™ drives, etc.) may also be used with the present invention. Machine readable removable media is software, content or instructions embodied on a removable media format. The terms machine readable removable media, removable media, disk, CD, CD-ROM and DVD-ROM will be used interchangeably. A reduced power consumption state is a reduced energy consumption mode for energy conservation. The terms reduced power consumption state, reduced power consumption mode, sleep mode, and standby mode will be used interchangeably.

A system wakeup or wakeup is an increase in the level of power consumed by a computer system from a reduced power consumption state to a higher power consumption state. A disk insert event is the perception of a disk being inserted into a drive as sensed by the increase in current drawn by the drive. The term wakeup signal will be used interchangeably with the terms wake signal and current draw detect signal.

Figure 1:
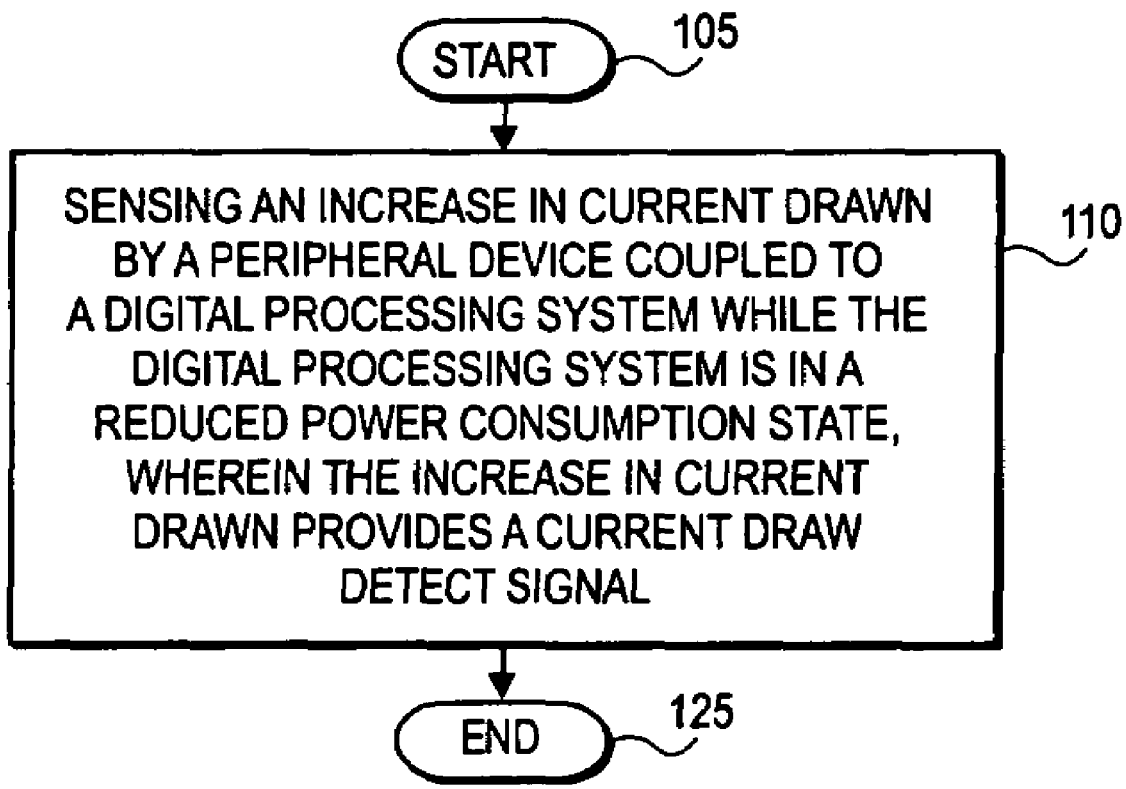
FIG. 1 is a flow diagram of one embodiment of a method for sensing peripheral power consumption.

FIG. 1 is a flow diagram of one embodiment of a method for sensing peripheral power consumption. At block 105, the process begins. At block 110 an increase in current drawn by a peripheral device coupled to a digital processing system while the digital processing system is in a reduced power consumption state is sensed, wherein the increase in current drawn provides a current draw detect signal. At block 125 the process ends.

Figure 2:
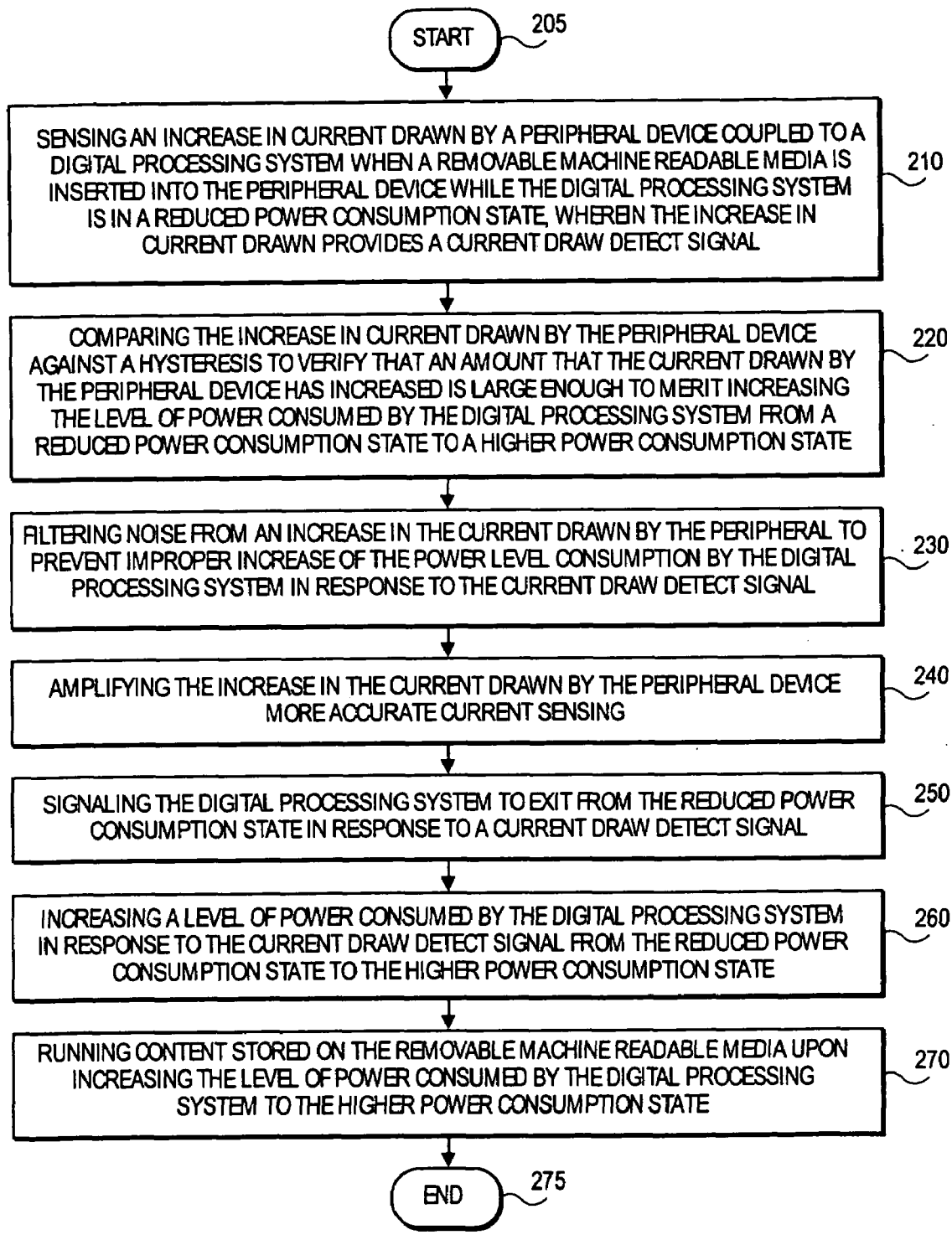
FIG. 2 is a flow diagram of one embodiment of a method for sensing increased current draw by a peripheral device upon insertion of a machine readable removable media into the peripheral device.

FIG. 2 is a flow diagram of one embodiment of a method for increasing the level of power consumed by a digital processing system in response to the insertion of a machine readable removable media into a peripheral device coupled to the digital processing system. At block 205, the process begins. At block 210, an increase in the current drawn by a peripheral device coupled to a digital processing system when a removable machine readable media is inserted into the peripheral device while the digital processing system is in a reduced power consumption state is sensed, wherein the increase in current drawn provides a current draw detect signal. At block 220, the increase in current drawn by the peripheral device is compared against a current consumption threshold level with a hysteresis value to verify that an amount that the current drawn by the peripheral device has increased is large enough to merit increasing the level of power consumed by the digital processing system from the reduced power consumption state to a higher power consumption state. At block 230, noise is filtered from an increase in the current drawn by the peripheral device to prevent improper increase of the power level consumed by the digital processing system. At block 240, the increase in the current drawn by the peripheral device is amplified for more accurate current sensing. At block 250, the digital processing system is signaled to exit from the reduced power consumption state in response to the current draw detect signal. At block 260, the level of power consumed by the digital processing system is increased in response to the current draw detect signal from a reduced power consumption state to the higher power consumption state. In one embodiment, the current drain detect signal does not directly wake the system. In another embodiment, the signal is received at a wakeup software within the digital processing system. The wakeup software may, in turn, control the system into a higher power consumption state. At block 270, content stored on a removable machine readable media is retrieved upon the increase in the level of power consumed by the digital processing system to the higher power consumption state. At block 275, the process ends.

Figure 3:
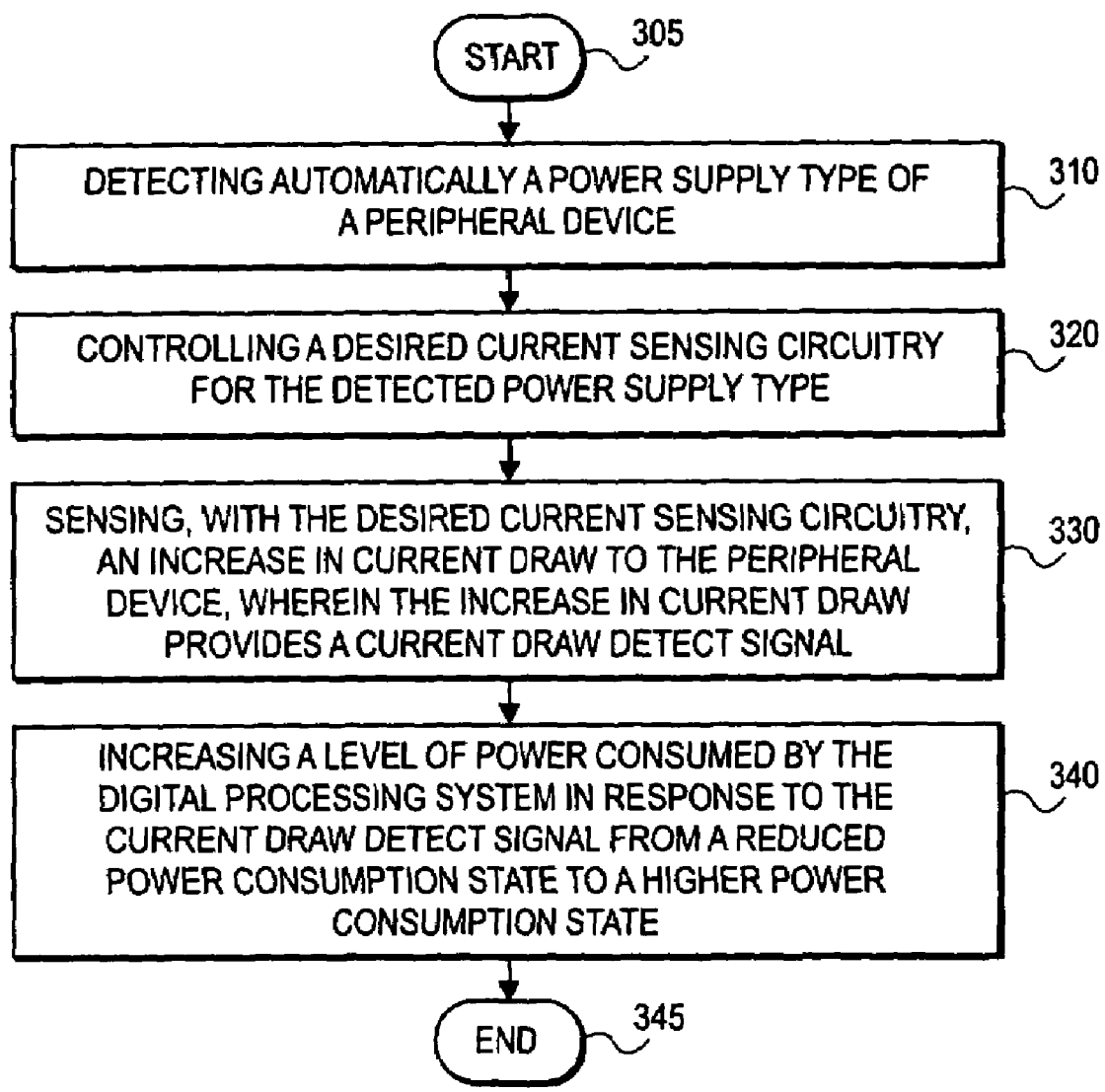
FIG. 3 is a flow diagram of one embodiment of a method for detecting automatically the power supply type of a peripheral device and increasing the level of power consumed by a digital processing system.

FIG. 3 is a flow diagram of one embodiment of a method for detecting automatically the power supply type of a peripheral device and increasing the level of power consumed by a digital processing system. At block 305, the process begins. At block 310, the power supply type of a peripheral device is detected automatically. At block 320, a desired current sensor circuitry for the detected power supply type is determined based upon the power supply type. At block 330, an increase in the current draw to the peripheral device is sensed with the desired current sensing circuitry, wherein the increase in current draw provides a current draw detect signal. At block 340, the level of power consumed by the digital processing system is increased in response to the current draw detect signal from a reduced power consumption state to the higher power consumption state. At block 345, the process ends.

In one embodiment, an automatic drive power type detection mechanism detects the type of power supply of the drive and disables current sensing circuitry for one or more power supply types when multiple power supply types are present in the drive. For example, in a drive with a 5V main power supply, 5V type current sensing circuitry can detect the current increase caused by the disk insert event and wake up the system correctly. However, in the case of 5V/12V drives, when the drive is operating in 5V mode it can be very difficult to distinguish a CD insert event from the normal amount of current flowing to the drive while in sleep mode due to noise and other problems. In the case of a multiple power supply drive, there is no standard for the power supply rail to be used for a disk insert operation. Furthermore, in order to keep the current detect threshold as high as possible with hysteresis, only one of the power supply rail should be used to detect disk insert operation. This can cause circuit misbehavior and false signals, i.e., false wakeups. Therefore, in such a case, if the 12V power rail shows current consumption above the disk insert operation power threshold level, the 5V sensor can be disabled. A more accurate reading can then be obtained from the 12V type sensor. It will be understood by one of ordinary skill in the art that 5V and 12V power supplies are used for the sake of example; other power supply types are also possible.

The system may compare a total of 12V and 5V signals to a hysteresis value, or compare the signals separately. The hysteresis may have upper and lower trigger points. The lower trigger point is a threshold for entering sleep mode. The upper trigger point is a threshold for detecting a disk insert event. The hysteresis serves to avoid false disk insert detects due to noise on the power supply without disturbing the system during normal operation. Absent such a hysteresis, the disk insert detect threshold can be set to a higher level to avoid false detects.

Figure 4:
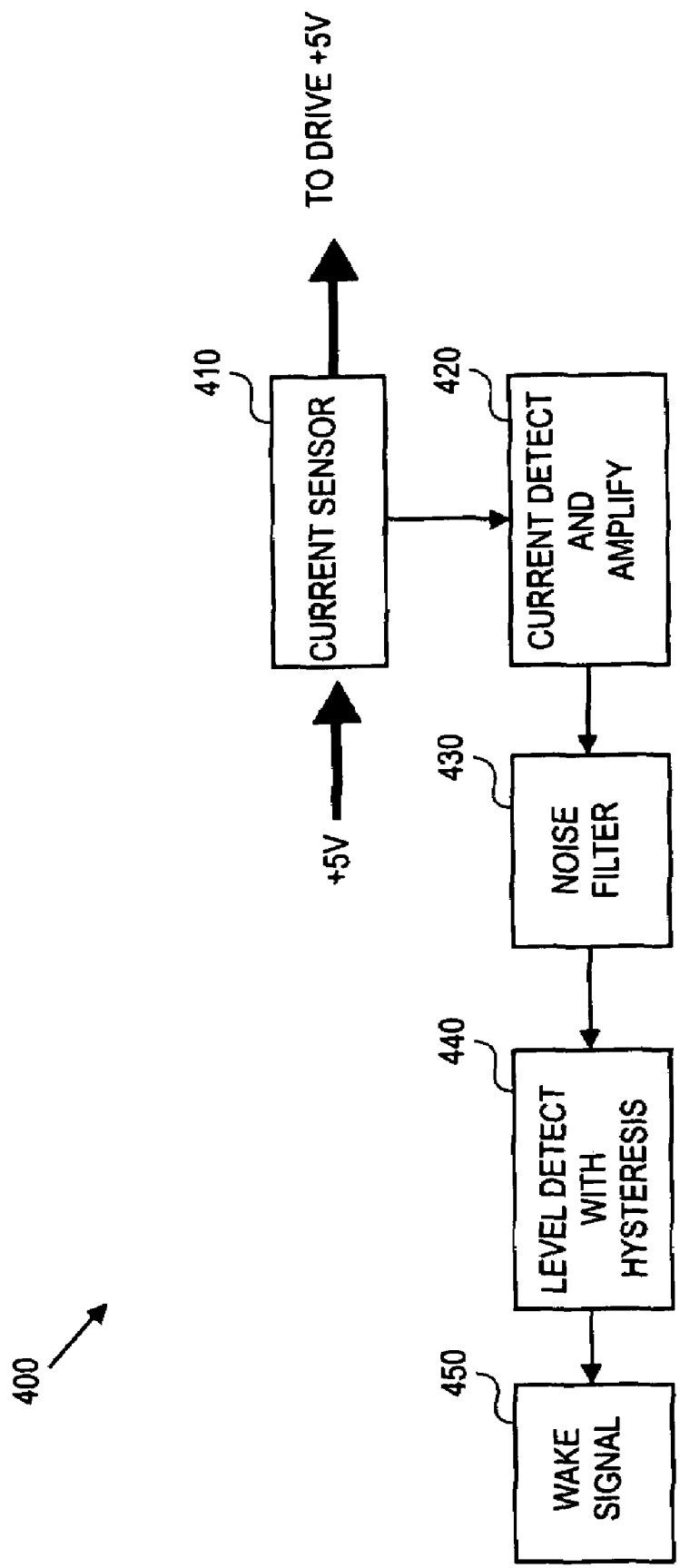
FIG. 4 is a block diagram of one embodiment of a current sensor system.

FIG. 4 is a block diagram of one embodiment of a current sensor system. Current sensor 410 reads single-voltage type power supply input en route to a single-voltage type drive. A 5V drive is shown in FIG. 4 as an example of a single-voltage type drive. Current sensor 410 detects the total power consumption of the drive. Current detect and amplify 420 receives output from current sensor 410 and detects differences in current draw between a reduced power mode and a higher power consumption mode. Current detect and amplify 420 also amplifies its detected current difference. Noise filter 430 filters noise from the reading of change in current draw to prevent improper increase of power level consumption or false triggering by a noise signal in the power supply. Level detect with hysteresis 440 has a lower threshold for entering sleep mode and an upper threshold for detecting increased peripheral power consumption, such as at a disk insert event. The hysteresis is used to determine whether the increase in peripheral power consumption is due to a disk insert or due to noise on the power supply. Wake signal 450 can be sent to a processor (e.g., a power controller or the system's main microprocessor) to wake the digital processing system from a reduced power consumption state.

Figure 5:
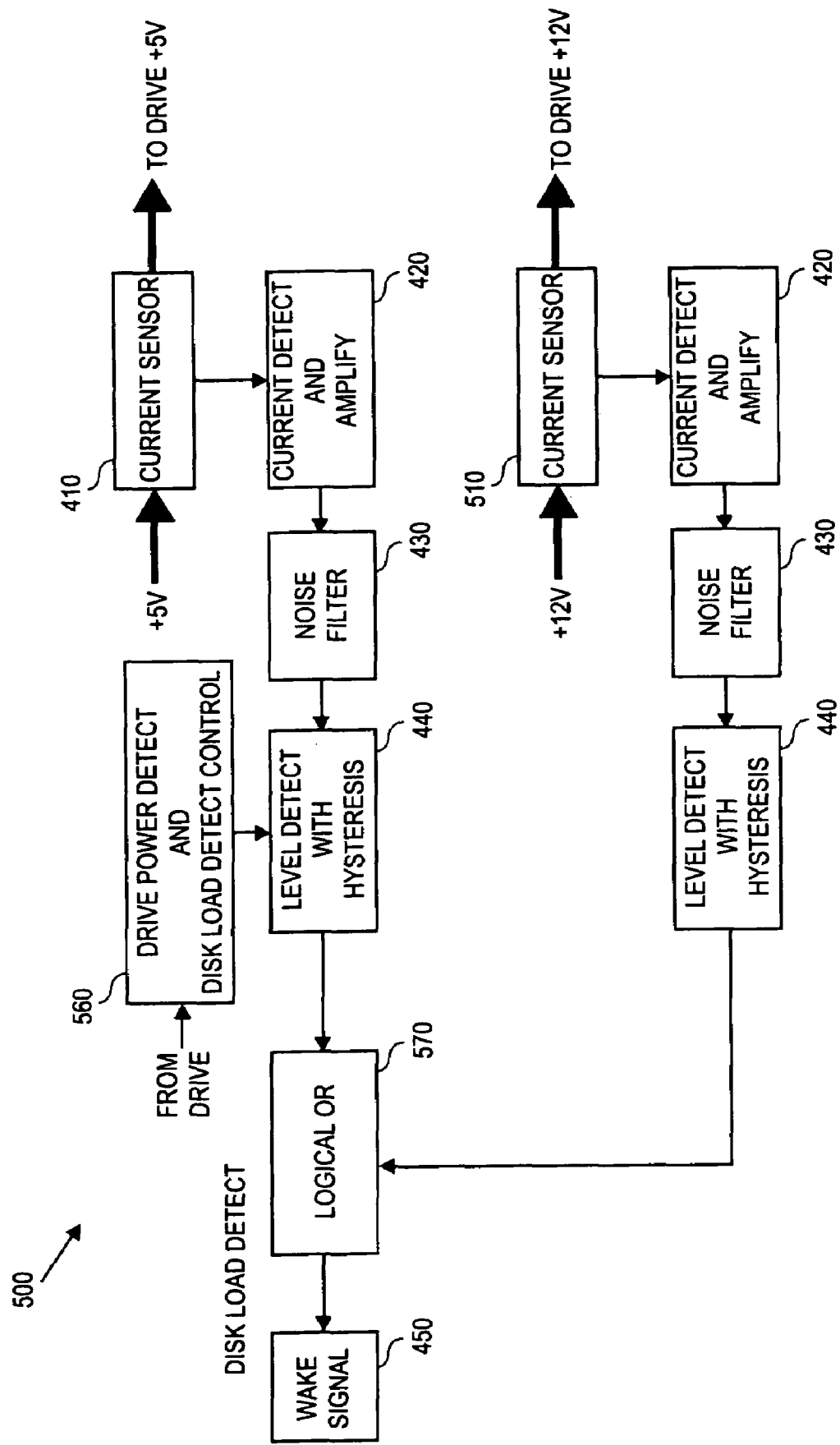
FIG. 5 is a block diagram of one embodiment of a system with multiple current sensor types.
Figure 6:
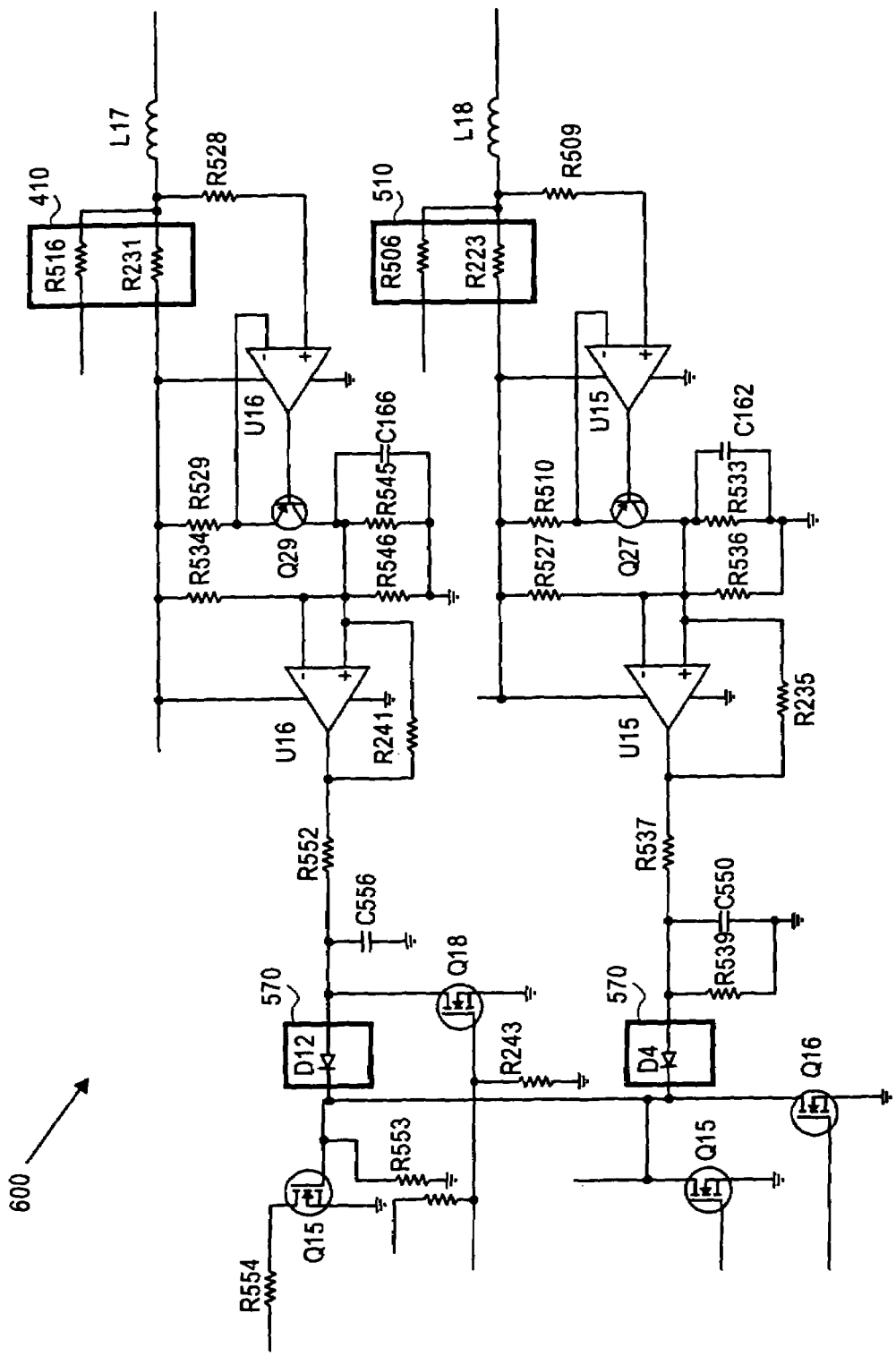
FIG. 6 is a circuit diagram of one embodiment of a multiple current sensor system.

FIG. 5 is a block diagram of one embodiment of a system with multiple current sensor types. In FIGS. 4, 5, and 6, similarly numbered blocks identify objects having the same function. Drive power detect and disk load detect control 560 determines the power supply type of the drive and disables the current sensor for at least one of multiple power supply types. In one embodiment, the power supply type detector 560 may be a redefined pin on an IDE cable, floppy cable, or SCSI cable. In another embodiment, drive power detect and disk load detect control 560 determines whether a 5V or a 5V/12V drive is present. (These drive types are exemplary; other drive types are also possible.) If a 5V/12V drive is present, the 5V drive is disabled. The 5V drive may be disconnected because the sensing of the 12V power supply shows a larger difference between wake mode and sleep mode. However, the 5V power level reading is noisy. Therefore, to avoid mistriggering of a wakeup due to noise from the 5V power level, the 5V sensing circuitry is disabled. Current sensor 510 performs the same function as current sensor 410, but for a different power supply type. Logical OR circuit 570 receives input from either current sensor 410 or current sensor 510.

In one embodiment, a 12V power supply current reading is translated down to a 5V reading. In order to sense 12V current readings, a 12V power supply is required in the circuitry. However, the signal that is used to trigger the CPU to wake up the system may need to be 5V. Therefore, the 12V signal is translated into a 5V signal or any other voltage that interfaces with the system logic (e.g., by a voltage level shifter) to be delivered to the CPU.

FIG. 6 is a circuit diagram of one embodiment of a multiple current sensor system. In this embodiment, current sensor 410 senses a 5V power rail. Current sensor 510 senses a 12V power rail. Logical OR circuit 570 receives output from either current sensor 410 or current sensor 510.

Figure 7:
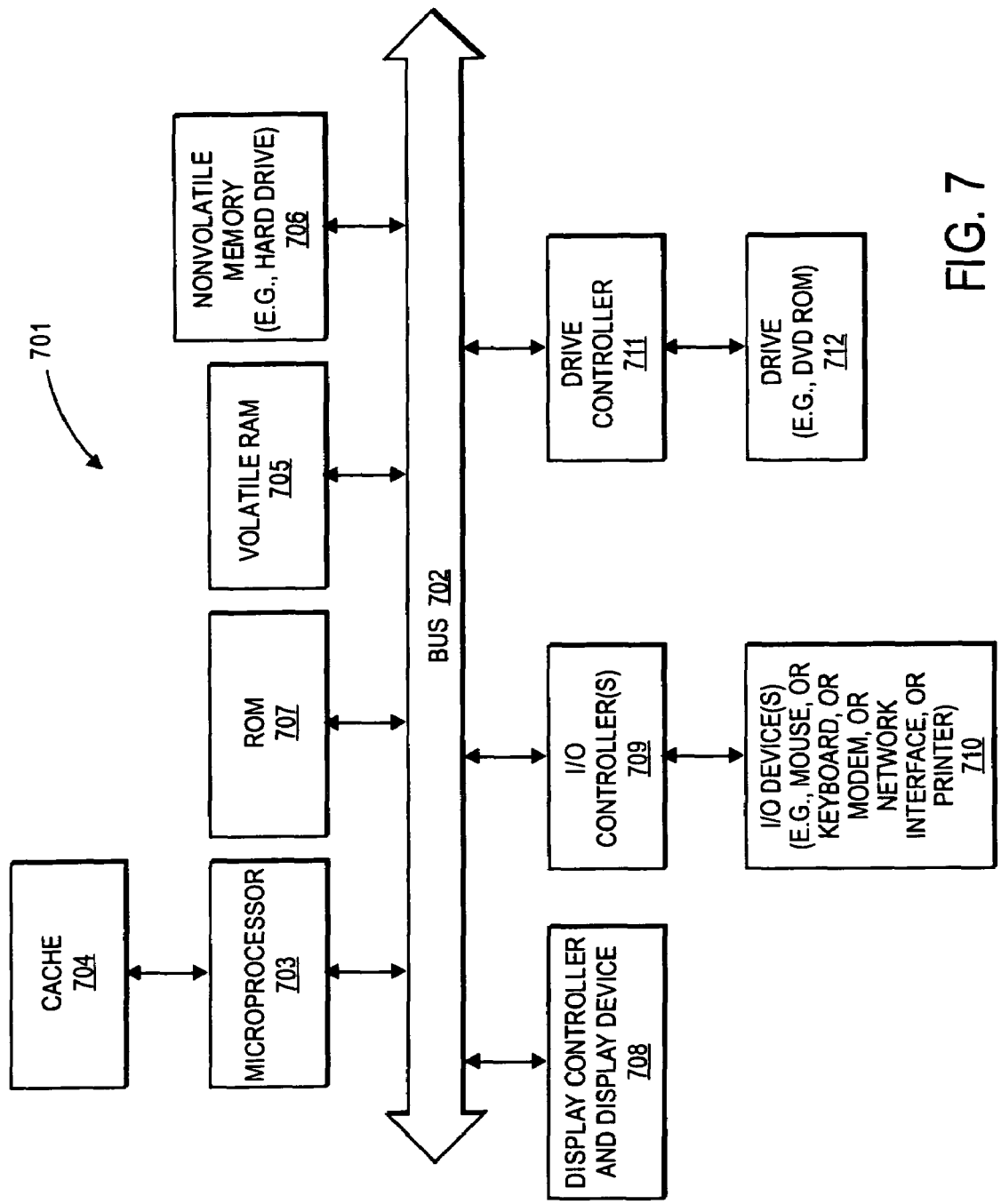
FIG. 7 shows one example of a typical computer system which may be used with the present invention.

FIG. 7 shows one example of a typical computer system which may be used with the present invention. Note that while FIG. 7 illustrates various components of a computer system, it is not intended to represent any particular architecture or manner of interconnecting the components, as such details are not germane to the present invention. It will also be appreciated that network computers and other data processing systems which have fewer components or perhaps more components may also be used with the present invention. The computer system of FIG. 7 may, for example, be an Apple Macintosh computer.

As shown in FIG. 7, the computer system 701, which is a form of a data processing system, includes a bus 702 which is coupled to a microprocessor 703 and a ROM 707 and volatile RAM 705 and a non-volatile memory 706. The microprocessor 703, which may be a G3 or G4 microprocessor from Motorola, Inc. or IBM is coupled to cache memory 704 as shown in the example of FIG. 7. The bus 702 interconnects these various components together and also interconnects these components 703, 707, 705, and 706 to a display controller and display device 708 and to peripheral devices such as input/output (I/O) devices which may be mice, keyboards, modems, network interfaces, printers, and other devices which are well-known in the art. Typically, the input/output devices 710 are coupled to the system through input/output controllers 709. The volatile RAM 705 is typically implemented as dynamic RAM (DRAM) which requires power continually in order to refresh or maintain the data in the memory. The non-volatile memory 706 is typically a magnetic hard drive or a magnetic optical drive or an optical drive or a DVD RAM or other type of memory system which maintains data even after power is removed from the system. Typically, the non-volatile memory will also be a random access memory, although this is not required. While FIG. 7 shows that the non-volatile memory is a local device coupled directly to the rest of the components in the data processing system, it will be appreciated that the present invention may utilize a non-volatile memory which is remote from the system, such as a network storage device, which is coupled to the data processing system through a network interface such as a modem or Ethernet interface. The bus 702 may include one or more buses connected to each other through various bridges, controllers, and/or adapters as is well-known in the art. In one embodiment the I/O controller 709 includes a USB (Universal Serial Bus) adapter for controlling USB peripherals. Drive 712 is coupled to the system by Drive controller 711. Drive controller 711 includes a sensor for sensing the current being drawn by Drive 712, and this sensor produces a current draw detect signal when an optical media (e.g., a CD ROM disk) is inserted into the drive 712.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 707, volatile RAM 705, non-volatile memory 706, cache 704, or a remote storage device. In various embodiments, hardwired circuitry may be used in combination with software instructions to implement the present invention. Thus, the techniques are not limited to any specific combination of hardware circuitry and software, nor to any particular source for the instructions executed by the data processing system. In addition, throughout this description, various functions and operations are described as being performed by or caused by software code to simplify description. However, those skilled in the art will recognize that what is meant by such expressions is that the functions result from execution of the code by a processor, such as the microprocessor 703.

Figure 8:
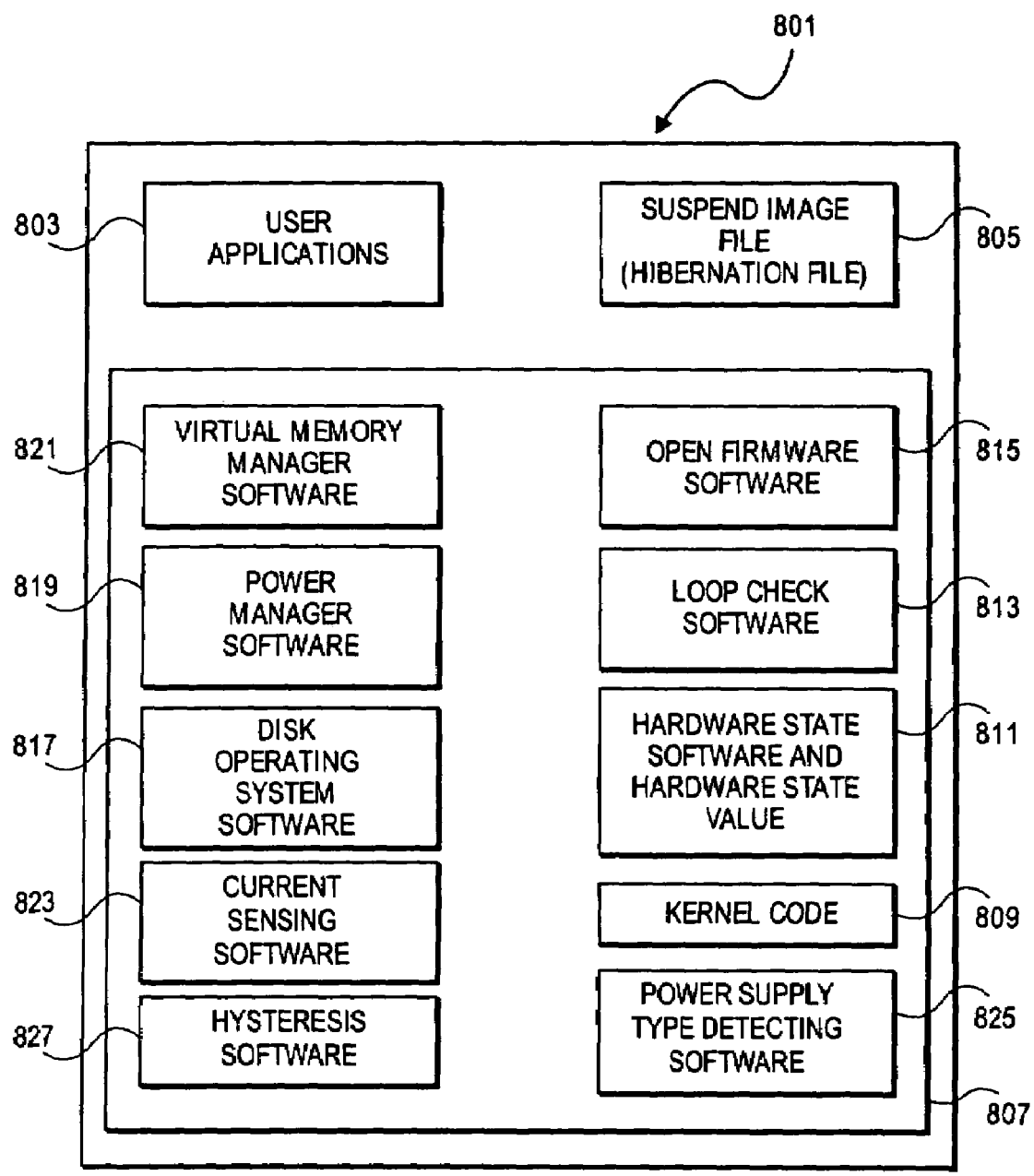
FIG. 8 shows an example of a computer readable media, which may be used with the data processing system according to one embodiment of the present invention.

FIG. 8 shows an example of a computer readable media which may be used with the data processing system according to one embodiment of the present invention. The computer readable media contains data and executable software which, when executed in the data processing system such as a digital processing system, cause the system to perform the various methods of the present invention. As noted above, this executable software and data may be stored in various places including, for example, the ROM 707, the volatile RAM 705, the non-volatile memory 706, and/or the cache 704. Portions of this software and/or data may be stored in any one of these storage devices. The media 801, for example, may be primarily the volatile RAM 705 and the non-volatile memory 706 in one embodiment. The user applications 803 represent software applications which are executing on the computer system, such as a word processing application or a spreadsheet application or an Internet web browser application. The operating system 807 includes the Open Firmware software 815 which may be stored in the ROM 707 and loaded into RAM 705 at boot up. The loop check software 813 performs the determination of whether it is safe to attempt to awaken the digital processing system from a sleep mode. The hardware state software and hardware state value 811 is the software which generates the hardware state value. The kernel code 809 represents the kernel of the operating system and performs numerous tasks. The virtual memory manager software 821 controls the virtual memory process. This typically involves maintaining a map of page data which represents the state of data in all the virtual memory which includes the physical RAM, such as volatile RAM 705 and a portion of the non-volatile memory 706 which has been designated as part of the virtual memory of the system. The virtual memory manager software will be performing conventional virtual memory processes as is known in the art. The power manager software 819 performs the various power managing operations, such as notifying applications and the system and drivers of changes to the power consumption state of the system. The software also monitors the state of the battery to determine whether sufficient power exists to continue to operate, and displays alerts to the user indicating the status of the battery and the power status of the system. The disk operating system software 817 performs the conventional functions of a disk operating system. This typically includes controlling the operation of a hard disk drive which in many examples is the non-volatile memory 706 which serves as a virtual memory for the volatile RAM 705. The current sensing software 823 controls the sensing of the current drawn by a peripheral device coupled to the digital processing system. Current sensing software 823 can detect the change in current at a disk insert event and decide whether to allow an increase in power consumption (e.g., a user may select an option to not increase power upon disk insertion and the software can cause the system to ignore this event). Power supply type detecting software 825 controls the detection of the power supply type of a peripheral device coupled to the digital processing system. Power supply detecting software 825 can signal current sensing software 823 to disable one of multiple current sensors. Hysteresis software 827 compares readings from current sensing software 823 against upper and lower trigger values. Signals from current sensing software 823 can be used to increase power consumption of the computer system to a higher power consumption state.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a digital processing system, said method comprising
    determining at least one of a plurality of power supplies to drive a peripheral device, each power supply being associated with a current sensor;
    enabling the current sensor associated with the at least one of the plurality of power supplies;
    sensing an increase in current drawn by the peripheral device driven by the determined power supplies coupled to the digital processing system while the digital processing system is in a reduced power consumption state, wherein the increase in current drawn provides a current draw detect signal.

2. The method of claim 1, further comprising
    increasing a level of power consumed by the digital processing system in response to the current draw detect signal from the reduced power consumption state to a higher power consumption state.

3. The method of claim 1, wherein the current drawn by the peripheral device is increased by an insertion of a removable machine readable media into the peripheral device.

4. The method of claim 2, further comprising
    signaling the digital processing system to exit from the reduced power consumption state in response to the current draw detect signal.

5. The method of claim 2, further comprising
    retrieving content stored on a removable machine readable media upon increasing the level of power consumed by the digital processing system to the higher power level consumption state.

6. The method of claim 5, wherein the retrieving of the content is selected from a group consisting of:
    playing an audio CD;
    playing a DVD; and
    running a computer software.

7. The method of claim 1, wherein the peripheral device is selected from a group consisting of:
    a CD-ROM drive;
    a CD-RW-ROM drive;
    a DVD-ROM drive; and
    a floppy disk drive.

8. The method of claim 1, further comprising
    providing the current draw detect signal to a system power controller software to control power consumption of the digital processing system.

9. A method in a digital processing system, said method comprising
    sensing an increase in current drawn by a peripheral device coupled to the digital processing system while the digital processing system is in a reduced power consumption state, wherein the increase in current drawn provides a current draw detect signal;
    increasing a level of power consumed by the digital processing system in response to the current draw detect signal from the reduced power consumption state to a higher power consumption state; and
    comparing the increase in current drawn by the peripheral device against a hysteresis to verify that an amount that the current drawn by the peripheral device has increased is large enough to merit increasing the level of power consumed by the digital processing system from the reduced power consumption state to the higher power consumption state, wherein, the hysteresis further comprises a reduced power level consumption state threshold and a higher power level consumption threshold.

10. A method in a digital processing system, said method comprising
    sensing an increase in current drawn by a peripheral device coupled to the digital processing system while the digital processing system is in a reduced power consumption state, wherein the increase in current drawn provides a current draw detect signal;
    increasing a level of power consumed by the digital processing system in response to the current draw detect signal from the reduced power consumption state to a higher power consumption state; and
    amplifying the increase in the current drawn by the peripheral device for more accurate current sensing.

11. A method comprising:
    determining at least one of a plurality of power supplies to drive a peripheral device, each power supply being associated with a current sensor;
    enabling the sensor associated with the at least one of the plurality of power supplies;
    sensing an increase in current drawn by the peripheral device driven by the determined power supplies coupled to a digital processing system while the digital processing system is in a reduced power consumption state, the increase caused by insertion of a removable machine readable media into the peripheral device; and
    executing content on the media in response to the sensing.

12. A digital processing system comprising:
    a control circuit coupled to a plurality of power supplies to determine at least one of the plurality of power supplies to drive a peripheral device;
    a plurality of current sensors coupled to the peripheral device which is coupled to the digital processing system, each current sensor coupled to a corresponding one of the plurality of power supplies, wherein the current sensor corresponding to the at least one of the plurality of power supplies is enabled according to the control circuit; and a processor coupled to the peripheral device, the current sensor detecting an increase in current drawn by the peripheral device during a reduced power consumption mode, the processor, in response to a signal from the current sensor, causing the digital processing system to enter into a higher power consumption mode.

13. The digital processing system of claim 12, wherein the sensor detects the increase in current drawn by the peripheral device upon the insertion of a removable machine readable media into the peripheral device.

14. The digital processing system of claim 13, wherein the removable machine readable media is selected from a group consisting of:
   a audio compact disk;
   a CD-ROM;
   a CD-RW-ROM;
   a DVD-ROM; and
   a floppy disk.

15. The digital processing system of claim 12, wherein the peripheral device is selected from a group consisting of:
   a CD-ROM drive;
   a DVD-ROM drive; and
   a floppy disk drive.

16. A digital processing system comprising
   a current sensor coupled to a peripheral device which is coupled to the digital processing system;
   a processor coupled to the peripheral device, the current sensor detecting an increase in current drawn by the peripheral device during a reduced power consumption mode, the processor, in response to a signal from the current sensor, causing the digital processing system to enter into a higher power consumption mode; and
   a noise filter to filter out noise from input to the current sensor.

17. A digital processing system comprising
   a current sensor coupled to a peripheral device which is coupled to the digital processing system; and
   a processor coupled to the peripheral device, the current sensor detecting an increase in current drawn by the peripheral device during a reduced power consumption mode, the processor, in response to a signal from the current sensor, causing the digital processing system to enter into a higher power consumption mode,
   wherein a hysteresis is used for comparison against the increase in the current drawn by the peripheral device to verify that the increase is large enough to merit causing the digital processing system to enter into the higher power consumption mode.

18. The digital processing system of claim 17, wherein the hysteresis further comprises a reduced power level consumption mode threshold and a higher power level consumption mode threshold.

19. An article comprising a computer-readable storage medium having stored thereon a plurality of instructions, which if executed by a machine, cause the machine to perform a method, the method comprising:
   determining at least one of a plurality of power supplies to drive a peripheral device, each power supply being associated with a current sensor;
   enabling the current sensor associated with the at least one of the plurality of power supplies; and
   sensing an increase in current drawn by the peripheral device driven by the determined power supplies, wherein the increase in current drawn provides a current draw detect signal.

20. The article of claim 19, wherein the method further comprises:
   increasing a level of power consumed by the digital processing system in response to the current draw detect signal from a reduced power consumption state to a higher power consumption state.

21. The article of claim 19, wherein the current draw to the peripheral device is increased by the insertion of a removable machine readable media into the peripheral device.

22. The article of claim 21, wherein the plurality of instructions to be executed by the machine further comprise
   retrieving content stored on the removable machine readable media upon increasing the level of power consumed by the digital processing system to the higher power level consumption state.

23. The article of claim 22, wherein the retrieving of the content is selected from a group consisting of:
   playing an audio CD;
   playing a DVD; and
   running a computer software.

24. An apparatus comprising:
   a determining means for determining at least one of a plurality of power supplies to drive a peripheral device, each power supply being associated with a current sensor;
   a enabling means to enable the current sensor associated with the at least one of the plurality of power supplies;
   a current sensing means for sensing current drawn by the peripheral device driven by the determined power supplies coupled to a digital processing system; and
   a processing means for increasing a level of power consumption of the digital processing system from a reduced power consumption mode to a higher power consumption mode upon receipt of a signal from the current sensing means indicating that the current drawn by the peripheral device has changed.

25. The apparatus of claim 24, wherein the determining means comprises:
   an automatic peripheral device power type detecting means for detecting the power supply type of the peripheral device; and
   a controlling means for controlling a desired sensing means for the detected power supply type.

26. The apparatus of claim 24, further comprising an OR logic means for fielding signals issuing from current sensors of one or more power supply types.

27. A method for waking a computer from a sleep mode comprising:
   determining a current consumption threshold for a drive of a computer, below which threshold the computer is in a sleep mode;
   enabling detection of current flowing to the drive while the computer is in the sleep mode; and
   enabling transmission of a wake-up signal to wake the computer from the sleep mode when the current flowing to the drive while the computer is in the sleep mode increases above the current consumption threshold for the drive.

28. The method of claim 27, wherein determining the current consumption threshold includes determining a hysteresis of the current consumption threshold.

29. The method of claim 28, wherein the hysteresis includes a lower trigger point, below which the computer is in the sleep mode, and an upper trigger point, above which transmission of the wake-up signal is enable.

30. The method of claim 27, wherein enabling detection of current flowing to the drive while the computer is in the sleep mode includes, when the drive is connected to more than one power rail, disabling detection of current flowing to the drive from a lower power rail.

31. The method of claim 30, further comprising redefining a pin on a cable connecting the drive to the computer, said redefined pin enabling detection of multiple power rails connected to the drive.

32. The method of claim 27, wherein enabling detection of current flowing to the drive while the computer is in the sleep mode includes, when the drive is connected to more than one power rail, translating a current reading from a first power rail into a signal for a second, lower, power rail.

33. The method of claim 27, further comprising enabling amplification of changes in detected current flow.

34. An apparatus capable of waking up from a sleep mode, the apparatus comprising:
a memory storing instructions for waking up from the sleep mode; and
a processor coupled to the memory to execute the instructions from the memory to determine a current consumption threshold for a drive of the apparatus, below which threshold the apparatus is in sleep mode,
enable detection of current flowing to the drive while the apparatus is in the sleep mode, and
enable transmission of a wake-up signal to wake the apparatus from the sleep mode when the current flowing to the drive while the apparatus is in the sleep mode increases above the current consumption threshold for the drive.

35. An apparatus capable of waking up from a sleep mode, the apparatus comprising:
a current sensor coupled to a drive of the apparatus; and
a logic coupled to the current sensor to process signals from the current sensor, the logic having a current consumption threshold for the drive, below which threshold the apparatus is in the sleep mode, the logic receiving data from the signals which indicate current flowing to the drive while the apparatus is in the sleep mode, and the logic enabling transmission of a wake-up signal to wake the apparatus from the sleep mode when the current flowing to the drive while the apparatus is in the sleep mode increases above the current consumption threshold for the drive.

36. The apparatus of claim 35, wherein the logic determines a hysteresis of the current consumption threshold for the current consumption threshold.

37. The apparatus of claim 35, wherein the logic enables amplification of changes in current flow.

* * * * *